United States Patent [19]
Meeker

[11] Patent Number: 4,943,113
[45] Date of Patent: Jul. 24, 1990

[54] CHILD RESTRAINT SYSTEM WITH IMPROVED BASE

[75] Inventor: Paul K. Meeker, Aurora, Ohio

[73] Assignee: Spalding & Evenflo Companies, Inc., Tampa, Fla.

[21] Appl. No.: 315,012

[22] Filed: Feb. 24, 1989

[51] Int. Cl.⁵ ............................................. A47D 1/10
[52] U.S. Cl. ..................................... 297/250; 297/440
[58] Field of Search ........................ 297/250, 130, 440

[56] References Cited

U.S. PATENT DOCUMENTS

| | | | |
|---|---|---|---|
| 4,306,749 | 12/1981 | Deloustal | 297/440 |
| 4,632,456 | 12/1986 | Kassai | 297/250 |
| 4,634,177 | 1/1987 | Meeker | 297/440 |
| 4,681,368 | 7/1987 | Heath et al. | 297/250 |
| 4,744,599 | 5/1988 | Jankowski et al. | 297/250 |
| 4,762,364 | 8/1988 | Young | 297/250 |
| 4,826,246 | 5/1989 | Meeker | 297/250 |

Primary Examiner—Francis K. Zugel
Attorney, Agent, or Firm—Donald R. Bahr

[57] ABSTRACT

An improved restraining system for a child comprising in combination an infant carrier having a foot end and a head end and side edges therebetween, the carrier having finger receiving slots in its lower face; and a base having a foot end and a head end and side edges therebetween, and extending upwardly from its upper surface fingers pivotably adapted to releasably receive the slots and an inverted J-shaped hook at its foot end.

7 Claims, 3 Drawing Sheets

CHILD RESTRAINT SYSTEM WITH IMPROVED BASE

BACKGROUND OF THE INVENTION

This invention relates to a child restraint system with an improved base and, more particularly, to an improved system which includes a infant carrier for receiving a child and a base adapted to removably receive the infant carrier, the base being constructed for coupling to the seat of a car through seat belts.

DESCRIPTION OF THE BACKGROUND ART

The safety of children in moving cars is a concern to parents. Such concern is also shared by the government where safety laws are being passed in increasing numbers of jurisdictions. Because of parental concern and governmental involvement, there has been a large number of technical advances relating to child restraint systems for cars. Such advances are directed to increased safety balanced against convenience of use. Cost is, of course, also a consideration. Lower costs tends to make systems available to a wider number of consumers and thus increase usage.

Commercially available devices and the background art disclose a wide variety of child restraint systems for use in cars. As a general rule, it seems that the safest devices are the ones which are more costly and more complex to use. High cost tends to negate wide usage of safety system by reducing the number of initial purchases while complex mechanisms can tend to discourage usage. Conversely, more convenient and less expensive devices often provide less safety even though they might be more widely purchased and used on a regular basis.

By way of example, note U.S. Pat. No. 4,545,613 to Martel which discloses a child restraint system for cars securable in position by car seat belts. Such system appears to be a well constructed unit for effecting child safety. However, the seat portion in which the child sits and the base portion therebeneath are attached to each other. Jointly they are coupled to the car seat through seat belts. The seat and base are both specifically designed for the particular intended function. As such the cost to the consumer is high, significantly higher than it would be if the infant seat itself were a standard item of commerce already in the possession of the parent.

The same is essentially true of the device disclosed in U.S. Pat. No. 4,743,063 to Foster. The Foster device does, in fact, have a separate base and a separate seat. The seat, however, is of a specific design and has no utility by itself except when used with other specifically designed supporting devices to which such seat may be coupled. Again, like the Martel device, the Foster device requires the purchase of both a specifically designed seat and a specifically designed base abating the possibility of wide usage.

Seat-base combination systems are also disclosed in U.S. Pat. Nos. 4,634,177 to Meeker and 4,729,600 to Single. Such systems are comprised of seats and bases separable from each other. Each base is of a unique design for the particular application while the seat portion has independent utility, a feature not found in the Martel and Foster devices. In Meeker, the side edges of the infant seat couple at two (2) spaced points at the lateral edges of the base. Uncoupling is effected through the rotation of a handle located in front of the child, a location wherein the uncoupling means may be within the grasp of the supported child. In the Single device, the infant seat has lower rails on the sides for receipt in parallel recesses of the base. Uncoupling is effected in the center front of the seat through a buckle depending from a belt. Coupling of the infant seat and base requires the careful alignment of the rails and slots by the parent.

None of the known commercial devices or prior patents disclose a system with a conventional, commercially available infant seat or carrier for coupling with the unique base of the present invention with attachment therebetween, front and rear as well as both sides, and with the release mechanism well below the top of the base, out of reach of the supported child, for convenient separation of the carrier and base. Although man such prior advances are noteworthy to one extent or another, no background patent or known commercial device teaches or suggests the reliable, convenient and economic child restraint system as disclosed herein.

As illustrated by a great number of prior patent disclosures and commercial devices, efforts are continuously being made in an attempt to more efficiently restrain children in cars. No prior effort, however, suggests the present inventive combination of component elements arranged and configured as disclosed herein. Prior devices do not provide the benefits attendant with the present invention. The present invention achieves its intended purposes, objectives and advantages over the prior art devices through a new, useful and unobvious combination of component elements, through the use of a minimum number of functioning parts, at a reasonable cost to manufacture, and through the utilization of only readily available materials and conventional components.

Therefore, it is an object of this invention to provide an improved restraining system for a child comprising an infant carrier having a foot end and a head end and side edges therebetween, the carrier having finger receiving slots in its lower face; and a base having a foot end and a head end and side edges therebetween, and pivotable fingers extending upwardly from its upper surface adapted to releasably receive the slots for thereby coupling the carrier to the base.

It is another object of this invention to uncouple a conventional infant carrier from a base secured in a car through a simple handle fully out of reach of the child supported in the carrier.

It is a further object of the present invention to secure an infant carrier to a base through attachment means located front and rear and at both sides.

Lastly, it is an object of the invention to restrain a child in a car more safely, reliably, conveniently and economically.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved restraining system for a child comprising in combination an infant carrier having a foot end and a head end and side edges therebetween, the carrier having finger receiving slots in its lower face; and a base having a foot end and a head end and side edges therebetween, and pivotable fingers extending upwardly from its upper surface adapted to releasably receive the slots for thereby coupling the carrier to the base. The system further includes a J-shaped hook in the base at the foot end for receiving the foot end of the carrier and cooperable with the fingers for securely holding the carrier with respect to the base at triangularly spaced points. The system further includes spring means attached to each finger between its pivot point and its point of contact with a slot. The system further includes a handle coupled to the fingers to move the fingers to a retracted position against the urging of the spring means to allow the separation of the carrier from the base. The system further includes recesses in the lower surface of the carrier and posts upstanding from the upper surface of the base and cooperable with the recesses for guiding the coupling of the carrier and base. The system further includes metallic plates secured to the base, each metallic plate having an aperture adjacent to a recess for receipt of a post and an edge for receiving a finger.

In addition, the invention may also be incorporated into an improved base for receiving an infant carrier comprising a foot end positionable adjacent to the seat of a car, a head end positionable remote therefrom, and side edges therebetween, holes adjacent to the foot end for receiving a conventional seat belt for securing the base to a car seat, pivotal fingers extending upwardly from the base and adapted to be received in slots of an infant carrier removable receivable on the base for releasably coupling the carrier to the base, spring means secured at one end to the fingers to resiliently urge the fingers in a lock position for coupling the carrier to the base and secured at the other end to a handle whereby an operator may pivot the fingers against the urging of the spring to allow the separation of the carrier from the base; and a J-shaped hook at the foot end of the base for receiving the foot end of the carrier whereby the fingers and hook may securely hold a carrier with respect to the base at triangularly spaced points.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar referenced characters refer to similar parts throughout the several Figures.

DETAILED DESCRIPTION OF THE INVENTION

Figure 1:
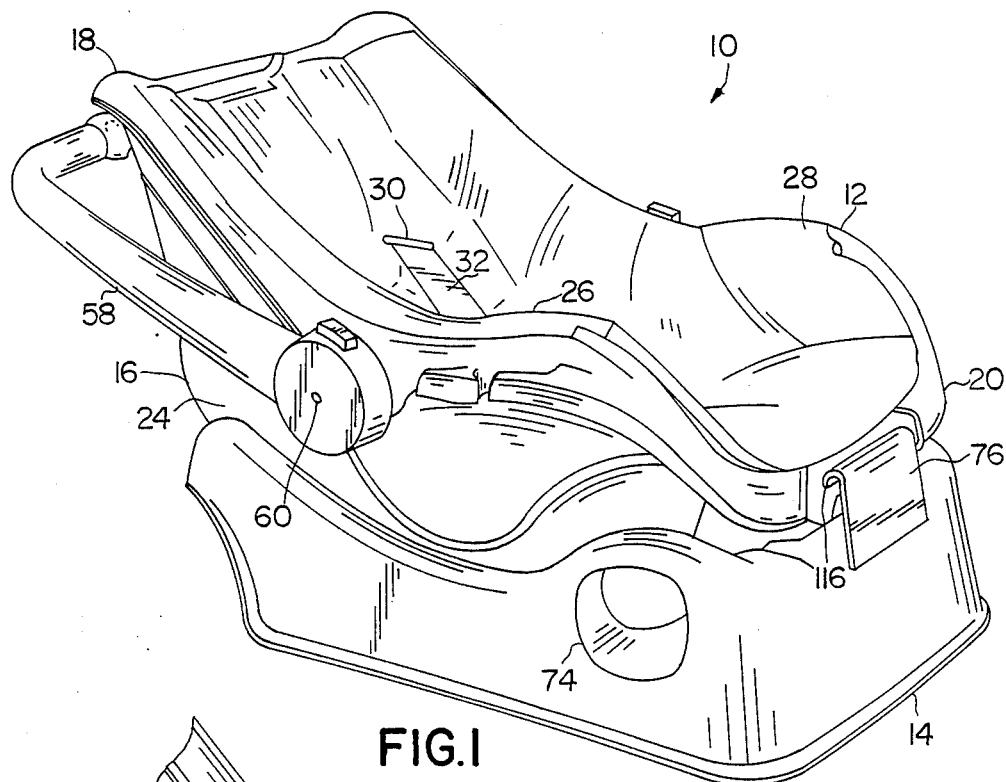
FIG. 1 is a perspective illustration of an infant carrier operatively coupled to a base, constructed in accordance with the principles of the present invention, for being secured by seat belts to a car seat.

From an overview standpoint, the present invention can most readily be seen by reference to the perspective showing of FIG. 1, particularly when viewed in association with the more detailed additional figures. The child restraint system 10 of the present invention is made up of two (2) major components, the infant seat or carrier 12 and the base 14.

The infant carrier 12 is of conventional construction. It includes a main body portion or shell 16 extending from a head end 18 to a foot end 20 and is constructed of the length greater than the length of the child to be supported therein. The shell 16 is contoured along its length in serpentine fashion for greater child comfort. Side portions 24 extend upwardly from both side edges of the central extent 26 to restrain the child against lateral movement. A soft pad 28 is utilized upon which the child may be placed for greater comfort. Elongated apertures 30 extend through the shell 16 and pad 28 for the passage of a plurality of belts 32 with buckles for restraining the child in the carrier in the normal manner.

The carrier 12 is preferably fabricated of a rigid impact resistant, high polymer plastic such as polyethylene, polyvinal chloride, or the like, similar to the material used for the base 14. The base and carrier are preferably color coordinated for esthetic purposes.

The lower face 36 of the carrier 12 is provided with strengthening ribs 38 and projections 40. In addition, recesses 44 and slots 46 are located adjacent to each side generally centrally along the length of the carrier but closer the head end 18 for effecting its coupling with the base in a manner as will be more fully described. A metallic plate 50 is secured to each side of the base as by screws. Each plate is shaped to conform with the base and is provided with an aperture 52 to overlie a slot 46. The edge 54 of the plate 50 receives the locking fingers, all for providing greater rigidity and longer life to the system 10.

The carrier is provided with a handle 58 in an inverted U-shaped configuration. The handle is coupled by pins 60 extending through the sides of the carrier at a central portion of its length.

The other component of the system is the base 14. The base includes a central extent 64 for receiving the central extent 26 of the carrier 12. Molded with the central extent are upstanding side walls 66. From head end 70, to foot end 72 its length substantially equals that of the mating surface of the carrier except that at the head end 70 the base 14 is slightly shortener than the carrier 12. The base is also curved in serpentine fashion from head end to foot end to mate with the curves of the carrier. The foot end 72 of the base 14 is located immediately beneath the foot end 20 of the carrier 12 for contact by the back of the seat of the car in which it is to be secured through a seat belt. Large holes 74 extend horizontally through the base 14 to allow the passage of a conventional car seat belt therethrough for effecting the coupling between the car seat and the base 14 and, consequently, the carrier 12 and child.

Coupling of the carrier 12 and the base 14 at their foot ends 20 and 72 is effected by an inverted J-shaped hook 76 molded into the base 14. The head end 70 of the base is also provided with releasable coupling mechanisms including grip 78 and arms 102 for securement of the carrier 12 thereto. Located at each side of the base 14 closer to the head end than the foot end are a pair of alignment posts 80 integrally molded with the base to extend upwardly therefrom for being received in mating recesses 44 formed in the bottom of the base by passage through apertures 52 of plate 50. Such posts 80 are formed as generally rectangular tongues, tapering vertically, which act with their associated recesses 44 to preclude lateral as well as longitudinal movement of the carrier with respect to the base and to guide their coupling. The vertical orientation of the posts 80 and recesses 44, however, does not preclude insertion of the carrier 12 onto the base 14 or its removal therefrom.

Positioned adjacent to the side portions 24 of the carrier 12, closer to the head end 18, are additional coupling mechanisms formed as a pair of locking fingers 84. The locking fingers are located to be received in slots 46 extending through the lower surface of the carrier 14. When coupled, the fingers 84 extend through the slots in the carrier. The slots 46 are of sufficient length to allow the pivoting of the fingers from a forward locked position to a rearward released position. When in the release position, the carrier 12 may freely move vertically onto the base 14 or be removed therefrom. When, however, in their forward locked position, facing the foot end 72, the horizontal abutment surface 86 will be located above the edge 88 of the slot 46 to preclude inadvertent lifting of the carrier from the base. The edge 54 of metallic plate 50 overlies the edge 88 of the slot 46 for a more secure coupling in addition to greater rigidity and a longer life.

Figure 3:
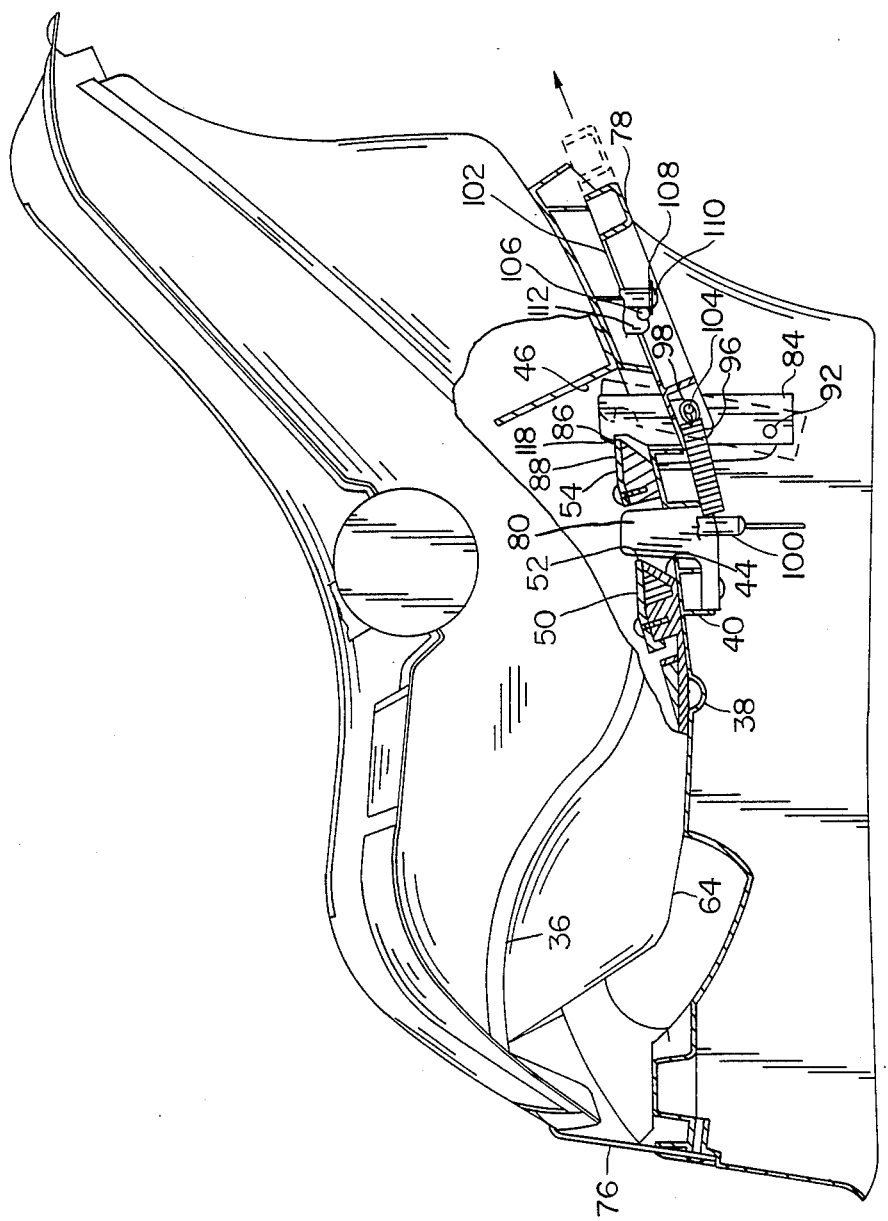
FIG. 3 is an exploded side elevational view, partly in section, of the carrier and base of FIGS. 1 and 2.
Figure 4:
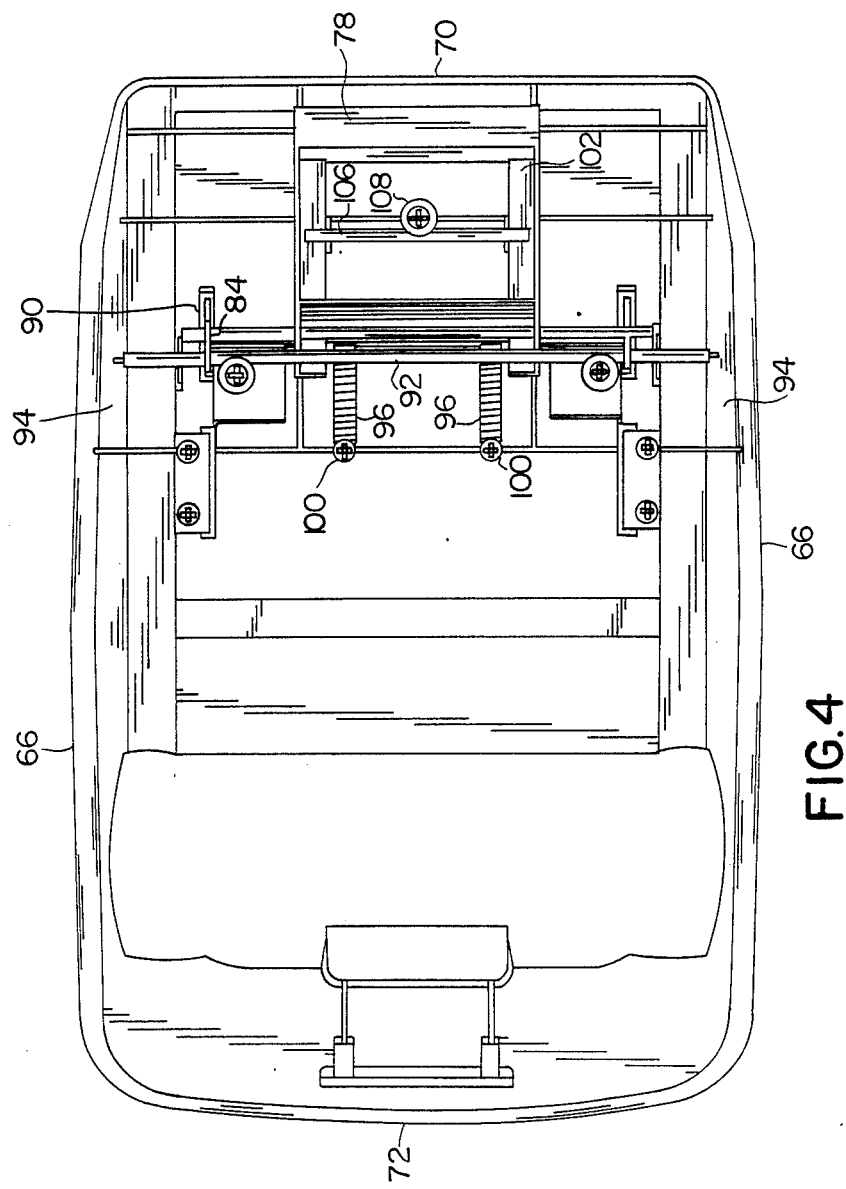
FIG. 4 is a plan view of the bottom of the base of the prior figures.

More specifically as seen in FIGS. 3 and 4, the fingers 84 are flat rigid members, upstanding through the base openings 90 and pivotable about an axis beneath the lower surface of the base 14. The fingers 84 are mounted on a common axle or shaft 92 secured for rotation by securement to downwardly extending supports 94 of the base. Coil springs 96 couple an intermediate region of each finger 84 through axle 98 to a more centrally disposed projection 100 depending from the base. The springs 96 thereby resiliently urge the axle 98 and fingers 84 toward a forward position overlying edges 54 and 88 for locking the carrier 12 to the base. A release grip 78 with rearwardly extending arms 102 is located with its exposed end adjacent to the head end with the rearward ends of the arms 102 secured to the resilient fingers 84 at intermediate regions through axle 104. In this manner, a parent or other adult may grasp the grip 78 at a location out of reach of the supported child and pull the handle forward, away from the carrier to concurrently pivot both fingers 84 toward the head end and thereby allow the previously locked carrier 12 to be lifted from the base. A fixed axle 106 is secured in position by a washer 108 on post 110 and forked fingers 112 to provide a bearing surface for guiding the movement of arms 102 and grip 78.

Figure 2:
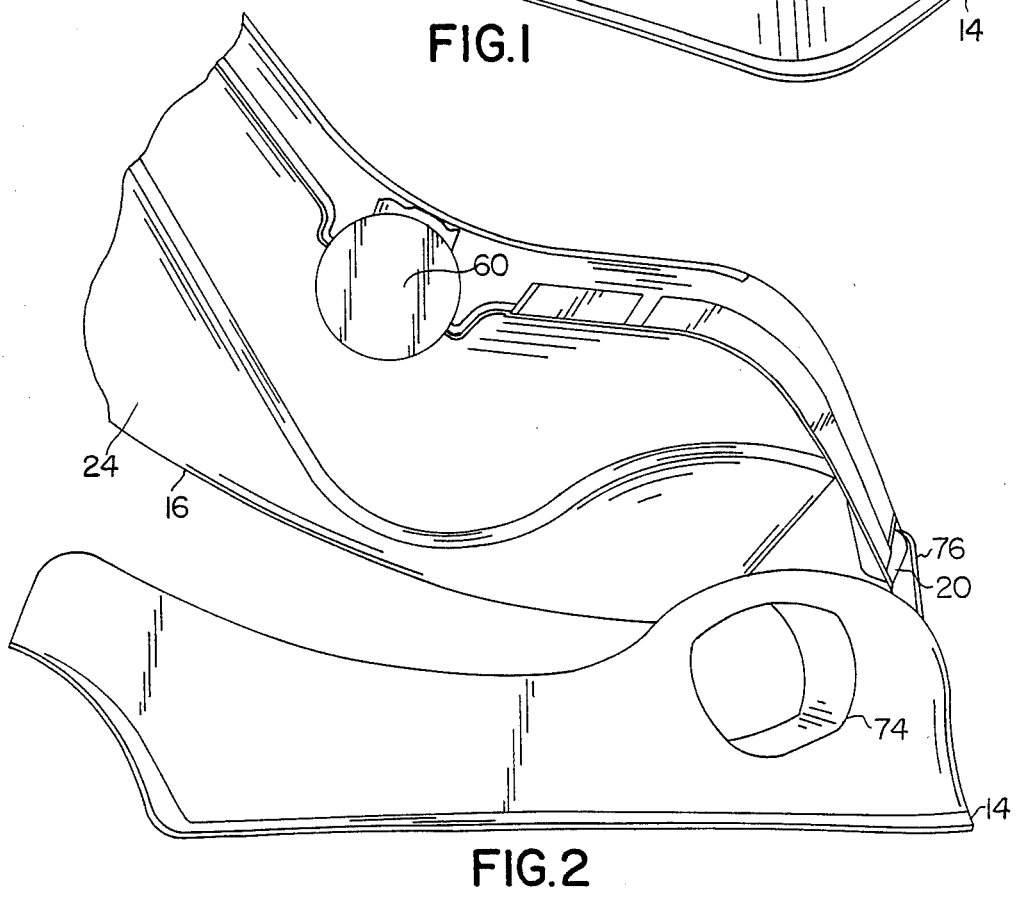
FIG. 2 is a side elevational view of the carrier and base of FIG. 1 but with the carrier in position for coupling or uncoupling with respect to the base.

In operation and use, the base 14 is first positioned on the seat of a car to which it is to be coupled with the foot end 72 adjacent to the back of the car seat. The seat belt is then threaded through the holes 74 in the foot end 72 of the base 14. The seat belt is then buckled and tightened for proper securement. The foot end 20 of the infant carrier 12 is then placed under the free end 116 of the J-shaped hook 76 at the foot end 72 of the base 14 with the head end 18 of the carrier slightly elevated. Note FIG. 2. The head end 18 is then rotated downwardly with the posts 80 of the base 14 receiving the recesses 44 of the carrier 12 and with the fingers 84 entering their associated slots 46. Further movement of the base to its securely coupled position will cause the foot end of each slot 46 to act as a cam to pivot the angled intermediate surface 118 of each finger 84. This action will rotate the fingers 84 against the action of the springs 96. The slots 46 will pass beneath the horizontal abutment surfaced 86 of the fingers 84 and the fingers 84 will resile to their forward locked position pivoted toward the foot end and above a portion of the carrier. A secure, three-point, triangular coupling is now provided between base 14 and carrier 12, two coupling points are at fingers 84 adjacent to the head end while one coupling point is at the J-shaped hook 76 adjacent to the foot end. The infant strapped to the seat will face rearwardly of the car.

In order to uncouple the carrier 12 from the base 14, the grip 78 is simply pulled outwardly from the base 14 toward the head end 70 and toward the front of the car in which it is secured. Such action will pivot the fingers 84 in the slots 46 so that the horizontal surfaces 86 of the fingers 84 are over the slots 46. The carrier 12 with its slots 46 may now be raised without interference from the fingers 84. The carrier 12 is then lifted from the head end 18. The grip 78 may then be released so that the fingers 84 will move forwardly under the action of the springs 96 but no longer contacting the carrier 14. Continued movement of the carrier will allow the foot end 20 to be lowered beneath the free end 116 of the J-shaped hook 76 for clearance and total removal of the carrier 12 from the base 14 with or without the child strapped in the carrier 12. The removed infant carrier 12 is then free to be utilized for supporting a child independent of the base 14 in its conventional fashion.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:
1. A restraining system for a child comprising in combination:
   an infant carrier having a foot end and a head end and side edges therebetween, the carrier having finger receiving slots in its lower face;

a base having a foot end and a head end and side edges therebetween, and pivotable fingers extending upwardly from the upper surface of the base adjacent to the side edges thereof adapted to releasably receive in the slots for thereby coupling the carrier to the base; and an inverted J-shaped hook in the base at the foot end for receiving the foot end of the carrier and cooperable with the fingers for securely holding the carrier with respect to the base at triangularly spaced points.

2. The system as set forth in claim 1 and further including spring means attached to each finger between its pivot point and its point of contact with a slot.

3. The system as set forth in claim 2 and further including a grip coupled to the fingers to move the fingers to a retracted position against the urging of the spring means to allow the separation of the carrier from the base.

4. The system as set forth in claim 2 and further including recesses in the lower surface of the carrier and posts upstanding from the upper surface of the base and cooperable with the recesses for guiding the coupling of the carrier and base.

5. The system as set forth in claim 4 and further including metallic plates secured to the base, each metallic plate having an aperture adjacent to a recess for receipt of a post.

6. The system as set forth in claim 5 wherein each metallic plate has an edge for receiving a finger.

7. A base for receiving an infant carrier comprising a foot end positionable adjacent to the seat of a car, a head end positionable remote therefrom, and side edges therebetween, holes adjacent to the foot end for receiving a conventional seat belt for securing the base to a car seat, pivotal fingers extending upwardly from the base and adapted to be received in slots of an infant carrier removably receivable on the base for releasably coupling the carrier to the base, spring means secured at one end to the fingers to resiliently urge the fingers in a lock position for coupling the carrier to the base and said fingers coupled other end to a grip whereby an operator may operate the grip to pivot the fingers against the urging of the spring to allow the separation of the carrier from the base; and a J-shaped hook at the foot end of the base for receiving the foot end of the carrier whereby the fingers and hook may securely hold a carrier with respect to the base at triangularly spaced points.

* * * * *